(12) United States Patent
Halford

(10) Patent No.: US 10,710,276 B2
(45) Date of Patent: Jul. 14, 2020

(54) MOULD TOOL

(71) Applicant: SURFACE GENERATION LIMITED, Rutland (GB)

(72) Inventor: Ben Halford, Rutland (GB)

(73) Assignee: SURFACE GENERATION LIMITED, Rutland (GB)

( * ) Notice: Subject to any disclaimer, the term of this patent is extended or adjusted under 35 U.S.C. 154(b) by 188 days.

(21) Appl. No.: 14/903,780

(22) PCT Filed: Jul. 8, 2014

(86) PCT No.: PCT/GB2014/052069
§ 371 (c)(1),
(2) Date: Jan. 8, 2016

(87) PCT Pub. No.: WO2015/004436
PCT Pub. Date: Jan. 15, 2015

(65) Prior Publication Data
US 2016/0167255 A1   Jun. 16, 2016

(30) Foreign Application Priority Data

Jul. 11, 2013   (GB) .................................. 1312441.7

(51) Int. Cl.
*B29C 33/04* (2006.01)
*B02C 23/18* (2006.01)
(Continued)

(52) U.S. Cl.
CPC ........ *B29C 33/046* (2013.01); *B02C 19/0075* (2013.01); *B02C 23/18* (2013.01);
(Continued)

(58) Field of Classification Search
CPC ....... B29C 33/046; B29C 33/04; B29C 43/52; B29C 45/7337; B29C 39/38; B29C 41/46;
(Continued)

(56) References Cited

U.S. PATENT DOCUMENTS 3,186,329 A * 6/1965 Kennedy ................. F24F 13/06
454/316
3,264,972 A * 8/1966 Averill .................. F24F 13/068
454/297
(Continued)

FOREIGN PATENT DOCUMENTS

CN       201863321 U    4/2018
JP        8-276434 A    10/1996
(Continued)

OTHER PUBLICATIONS

International Search Report in PCT/GB2014/052069 dated Nov. 28, 2014.
(Continued)

*Primary Examiner* — Matthew J Daniels
*Assistant Examiner* — Andrew L Swanson
(74) *Attorney, Agent, or Firm* — Young Law Firm, P.C.

(57) ABSTRACT

A mould tool assembly (10) has a mould tool component (14) having a temperature control face (24) arranged to be in thermal contact with a mould face (12), a temperature control arrangement (26) comprising a fluid outlet (32) directed towards the temperature control face (24); and a thermally conductive structure (40) extending from: (i) a first region in which the structure (40) is offset from the temperature control face (24) and the structure is in the path of a fluid jet (1) emanating from the fluid outlet (32) to (ii) a second region in contact with temperature control face, which second region is spaced from the first region. A diffuser (70; 80; 90) is also provided on the temperature control face for more event mould tool heating.

19 Claims, 12 Drawing Sheets

(51) Int. Cl.
  *B02C 19/00* (2006.01)
  *B29C 45/73* (2006.01)
  *B02C 25/00* (2006.01)
  *B29C 43/52* (2006.01)

(52) U.S. Cl.
  CPC .............. *B02C 25/00* (2013.01); *B29C 33/04* (2013.01); *B29C 43/52* (2013.01); *B29C 45/7337* (2013.01); *B29C 33/048* (2013.01)

(58) Field of Classification Search
  CPC ... B29C 35/045; B02C 19/0075; B02C 23/18; B02C 25/00; B20C 2034/046–048
  See application file for complete search history.

(56) References Cited

U.S. PATENT DOCUMENTS

| | | | | |
|---|---|---|---|---|
| 4,621,995 | A * | 11/1986 | Wersosky | B29C 33/046 137/625.33 |
| 4,890,995 | A * | 1/1990 | Gray | B29C 33/046 264/301 |
| 6,072,158 | A | 6/2000 | McNally | |
| 2001/0020757 | A1* | 9/2001 | Fried | B29C 33/34 264/443 |
| 2002/0162940 | A1* | 11/2002 | Frul | B29C 33/04 249/79 |
| 2005/0280661 | A1 | 12/2005 | Kim Tae-Gyu et al. | |
| 2005/0280681 | A1* | 12/2005 | Kim | H01L 21/67109 347/102 |
| 2013/0136817 | A1 | 5/2013 | Kawaguchi et al. | |

FOREIGN PATENT DOCUMENTS

| | | |
|---|---|---|
| JP | H08276492 A | 10/1996 |
| JP | 2000-15421 A | 1/2000 |
| JP | 2003-1378 A | 1/2003 |
| JP | 2003-231165 A | 8/2003 |
| WO | 2013021164 A2 | 2/2013 |
| WO | 2013021195 A2 | 2/2013 |
| WO | 2013068749 A2 | 5/2013 |

OTHER PUBLICATIONS

GB Intellectual Property Office Search Report under Section 17 dated Jan. 7, 2014 in GB1312441.7 (2 pages).
Office Action dated Jan. 17, 2019 in R.O.C. (Taiwanese) patent application 103123775.
JPO Office Office Action dated Jul. 31, 2018 in JP Appln 2016-524891 and machine translation thereof.
JPO Office Action dated Jan. 7, 2020 in JP application 2016-524891.
EPO Communication pursuant to Article 94(3)EPC dated Jan. 20, 2020.

* cited by examiner

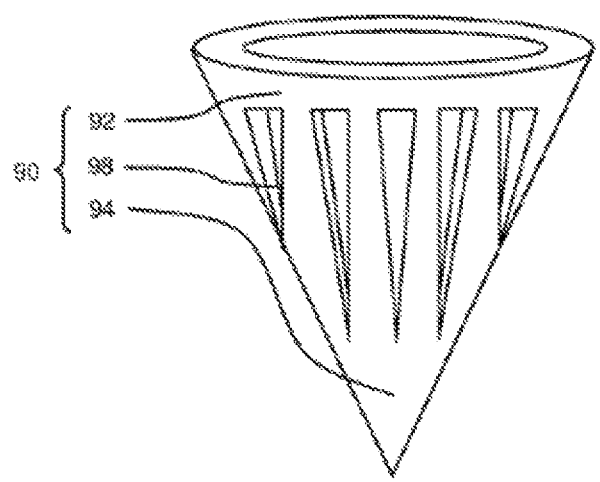
Fig. 9
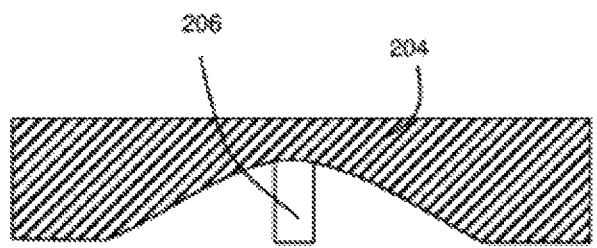
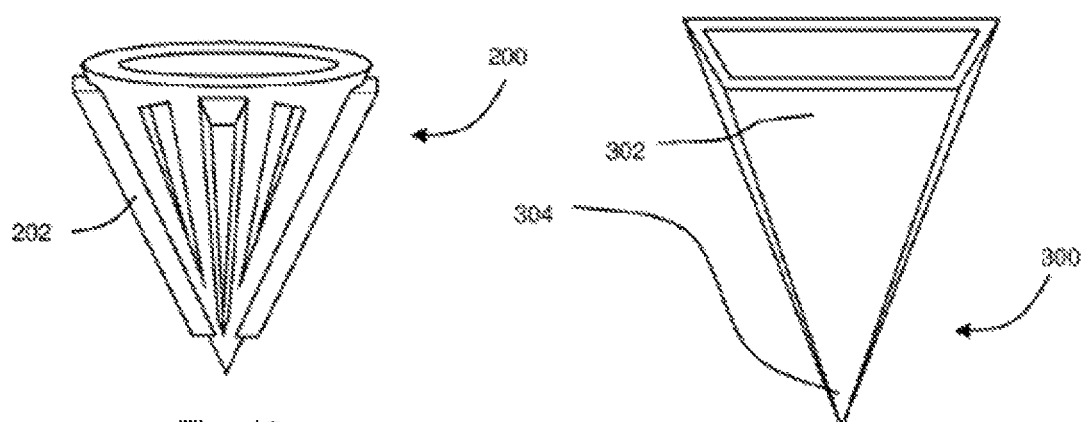
Fig. 10
Fig. 11

MOULD TOOL

BACKGROUND

The present invention is concerned with a mould tool assembly. More specifically, the present invention is concerned with a fluid heated and cooled mould tool assembly in which the back face of the mould tool is heated and cooled by impingement of a fluid jet.

By influencing the temperature of a mould face during the moulding of plastics, composites and the like, the curing process can be controlled, and the properties of the workpiece tailored to specification. The temperature of such moulds can be controlled by the use of a fluid jet impinging on the back face of either or both opposing tools, A first side of the tool defines mould face against which a workpiece is moulded, and a second, opposite, side defines a temperature control face (in thermal contact With the mould face). Fluid jets are directed onto the temperature control face in order to selectively heat and cool the tool. The fluid jet can be heated by an in-line air heater, or simply directed at ambient temperature in order to provide a cooling effect. This selective heating and cooling can influence the properties of the material within the mould to produce the desired results. The moulding of parts with variable thickness, properties and or geometry can be controlled by subdividing the tool into a plurality of zones, each of which is individually controlled.

A problem with using such impinging fluid jets is that in high speed, high power heating and cooling, the temperature gradient across an individual zone can vary considerably, For example, if a high power fluid jet (for example, 250 kilowatts per metre squared) impinges on the centre of a temperature control face, then a significant temperature gradient can arise from the impingement point to the edges of the zone. Similarly, attempts to rapidly cool the tool can result in high temperature gradients. This is undesirable. It is desirable to equalise the temperature across the zone.

One solution to this problem is to coat the underside of the mould (i.e., the temperature control surface) with a high conductivity material such as copper.

Although this provides additional conductivity between the impingement region and the edge of the tool, significant temperature gradients still exist.

It is an object of the present invention to overcome or at least mitigate the above referenced problem.

SUMMARY

According to a first aspect of the invention there is provided a mould tool assembly comprising:
a mould tool component having a temperature control face arranged to be in thermal contact with a mould face;
a temperature control arrangement comprising, a fluid outlet directed towards the temperature control face; and,
a diffuser arranged between the temperature control arrangement and the temperature control face.

By "diffuser" we man a structure which is arranged to diverge a fluid flow.

Advantageously, by providing a diffuser between the temperature control arrangement and the temperature control face, the heating fluid may be deflected such that it impinges on the larger region of temperature control surface, as compared to a single point impingement site.

Preferably the diffuser tapers outwardly from the fluid outlet towards the temperature control face. More preferably the diffuser comprises an at least frustoconical surface, more preferably the diffuser comprises a conical surface.

This allows deflection of the flow with minimal deceleration of the flow, whilst resulting in a substantially annular shaped impingement region on the temperature control surface.

Preferably the diffuser is arranged at least partially within the fluid outlet of the temperature control arrangement. Advantageously this ensures that the flow is deflected by the diffuser, even at lower fluid flow speeds. This also facilitates maximum diffusion as the distance from the tip of the diffuser in the outlet to the temperature control face is maximised.

The diffuser may be suspended from the temperature control face. More preferably, a support arrangement tor suspending the diffuser does not act to obstruct the fluid flow.

Alternatively the diffuser is mounted on the temperature control arrangement, such as on the fluid conduit. The diffuser may be mounted on structures extending inwardly from walls of fluid conduit defining the fluid outlet. Advantageously the diffuser and temperature control arrangement may therefore be supplied as a sub-assembly, simplifying tool assembly.

Preferably the diffuser has a non-continuous surface. Preferably openings, perforations or holes within the diffuser are provided which advantageously encourages mixing of the heating fluid and therefore contributes to a more homogeneous heating of the tool zone.

In an alternative embodiment, instead of being a separate component, the diffuser may be provided integral with the tool—i.e. as a unitary part.

The diffuser may be a curved closed shape in cross section, such as a circle or ellipse. Alternatively the diffuser may be a polygon in cross section, such as a square, rectangle or hexagon.

The mould tool component may comprises an endless wall attached to the temperature control face, the wall defining a zone shape where it meets the temperature control face, in which the diffuser is shaped to provide a fluid impingement region substantially homothetic with the zone shape. This allows for more even heating, as heat will generally conduct away from the impingement region at the same speed.

The diffuser may comprise at least one rib extending outwardly from its outer surface. The rib preferably extends axially (i.e. in the same direction as the fluid flow).

Preferably the mould tool component defines surface features on the temperature control face, and in which the ribs mirror the surface features.

Preferably the surface features are mould tool component ribs having a concave cross section.

Preferably the mould tool component comprises a sidewall attached to the temperature control face to define a fluid chamber, and in which the mould tool comprises a baffle between the temperature control arrangement and the sidewall.

The baffle may be a "wide" or "thick" baffle defining a surface facing the temperature control face to define a radially outwardly extending flow channel therebetween. This accelerates the flow and ensures the flow remains closed to the temperature control face for heating the extremities thereof. Preferably such a baffle comprises a surface facing the temperature control assembly, and a surface facing the sidewall offset from the surface facing the temperature control arrangement. The baffle may define a cavity between the a surface facing the sidewall and the surface facing the temperature control arrangement. This allows the baffle to heat up to avoid the losses created by conduction/radiation from the conduit to the returning flow. Effectively the baffle insulates the returning flow from the conduit.

A second type of baffle—a "thin" baffle may be positioned to create a first return flow channel between the baffle and the temperature control arrangement and a second return flow channel between the baffle and the sidewall. The second flow insulates the sidewall from the first flow, reducing heat transfer to the adjacent cells. Preferably the baffle is positioned closer to the sidewall than to the temperature control arrangement to further limit heat transfer to the adjacent cells.

According to a second aspect of the invention there is provided a method of manufacturing a workpiece comprising the steps of: providing a mould tool assembly comprising a mould tool component having a temperature control face arranged to be in thermal contact with a mould face; providing a temperature control arrangement comprising a
   fluid outlet directed towards the temperature control face;
providing a diffuser arranged between the temperature control arrangement and the temperature control face;
directing fluid at the temperature control face with the temperature control arrangement such that the fluid is diffused by the diffuser before impinging on the temperature control face to heat or cool the mould tool component;
using the mould tool to mould a workpiece.

Preferably the step of providing a mould tool comprises the step of providing a mould tool according to the first aspect.

According to a third aspect of the invention there is provided a mould tool assembly comprising:
a mould tool component having a temperature control face arranged to be in thermal contact with a mould face;
a temperature control arrangement comprising a fluid outlet directed towards the temperature control face; and,
a thermally conductive structure extending from: (i) a first region in which the structure is offset from the temperature control face and the structure is in the path of a fluid jet emanating from the fluid outlet to (ii) a second region in contact with temperature control face, which second region is spaced from the first region.

By "thermal contact" we mean able to conduct thermal energy therebetween. Advantageously, by providing thermally conductive structure spaced from the temperature control surface, heat can be conducted away from the impingement area (i.e., the first region). By tailoring the temperature control arrangement to the characteristics of a tool, even heating can be encouraged across the zone in question.

Preferably the mould tool component is constructed from a first material which has a first thermal conductivity, and the thermally conductive structure is constructed from a second material which has a higher thermal conductivity than the first material. The materials may be Invar and copper respectively.

Preferably the mould tool component defines a temperature control zone having a boundary, and in which the second region is closer to the boundary than to the first region. Advantageously, this aids conduction to the periphery of the zone to encourage even heating and cooling.

Preferably the mould tool component comprises a sidewall projecting from the temperature control face, the sidewall defining the boundary. This allows the heating and cooling fluid to be contained.

The temperature control zone may be a quadrilateral, in which case the second region is preferably closer to a corner of the quadrilateral than to the first region.

Preferably, the thermally conductive structure extends to a third region in contact with temperature control face, which third region is spaced from the first region, and is on the opposite side of the first region to the second region. The structure therefore forms a "bridge" with the central span offset from the tool.

Preferably the structure comprises a first strip of conductive material extending from the second region to the third region. A second strip of conductive material is preferably provided, crossing the first strip of material at the first region, the second strip of material extending from a third region in thermal contact with the temperature control face to a fourth region in thermal contact with the temperature control face.

Preferably the thermally conductive structure bifurcates at the region or regions where it is in thermal contact with the temperature control face.

According to a fourth aspect of the invention there is provided a method of manufacturing a workpiece comprising the steps of:
providing a mould tool having a mould tool component, the mould tool component having a mould face and a temperature control face opposite the mould face;
providing a thermally conductive structure extending from (i) a first region in which the structure is offset from the temperature control face to (ii) a second region in contact with temperature control face, which second region is spaced from the first region;
directing a fluid jet at the first region to heat or cool the mould tool component whilst moulding a workpiece in the mould tool.

Preferably the step of providing a mould tool comprises the step of providing a mould tool according to the third aspect.

Any of the above aspects may be provided in a plurality of mould tool zones, which tessellate to define a mould tool surface. Therefore the above aspects facilitate temperature control in a multi zone tool such as that described in PCT/GB2010/001935 (which is hereby incorporated by reference where permitted).

BRIEF DESCRIPTION OF THE DRAWINGS

An example mould tool assembly according to the present invention will now be described with reference to the following figures, in which:

FIG. 9 is a schematic representation of a diffuser in accordance with the present invention;

FIG. 10 is a schematic representation of a further diffuser in accordance with the present invention;

FIG. 11 is a schematic representation of a still further diffuser in accordance with the present invention;

DESCRIPTION

Figure 1:
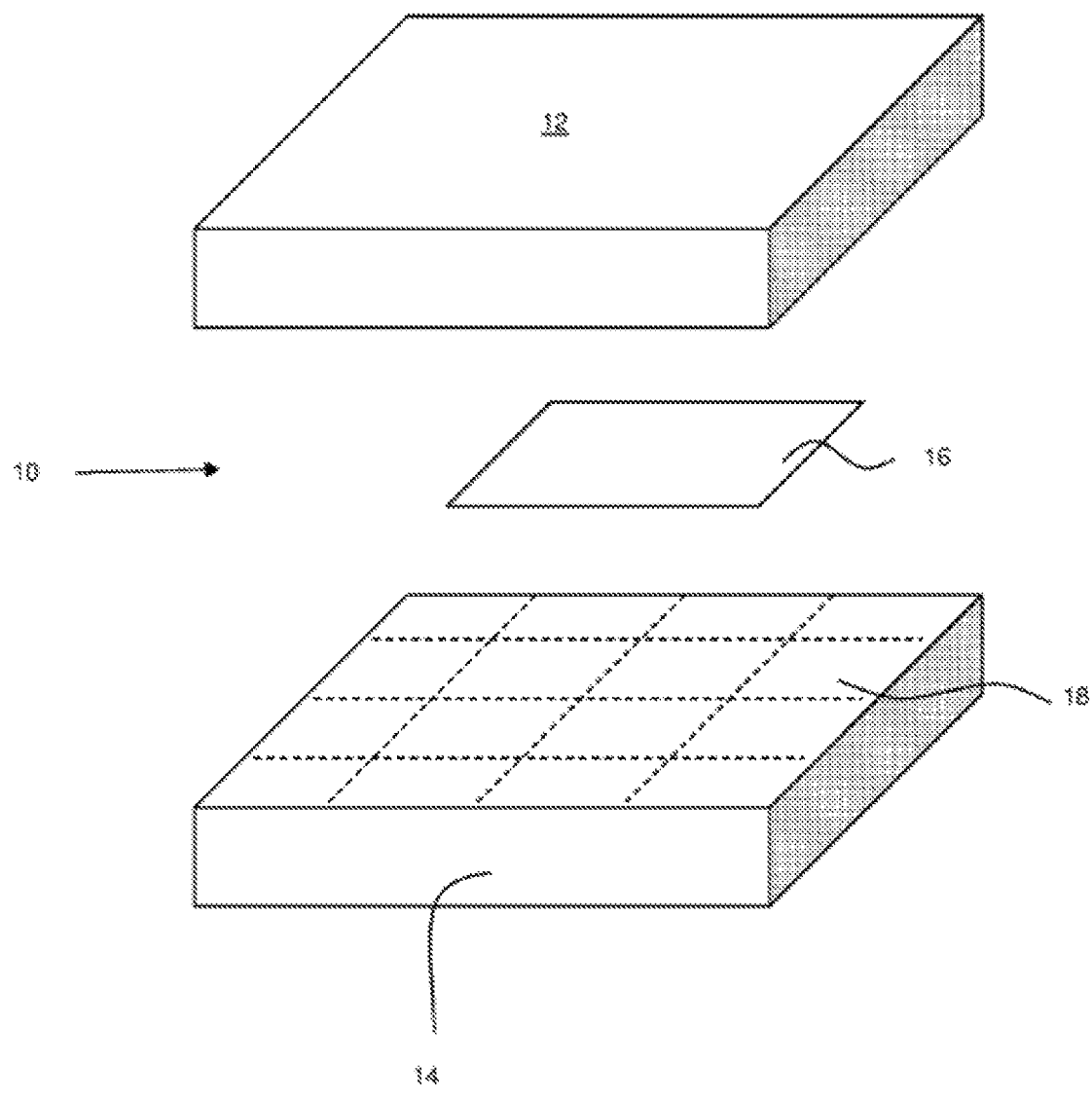
FIG. 1 is a schematic representation of a fluid jet heated mould tool.

Turning to FIG. 1 there is shown a typical mould tool 10 having an upper mould 12 and a lower mould 14 between which a billet of material 16 is disposed, which material is to be moulded to form a component. The moulds are constructed from a material with a low thermal expansion coefficient, e.g., Invar (Nickel-Iron alloy). The lower mould 14 is divided into a number of zones 18, each of which can be independently temperature controlled by the arrangement shown in FIG. 2.

Figure 2:
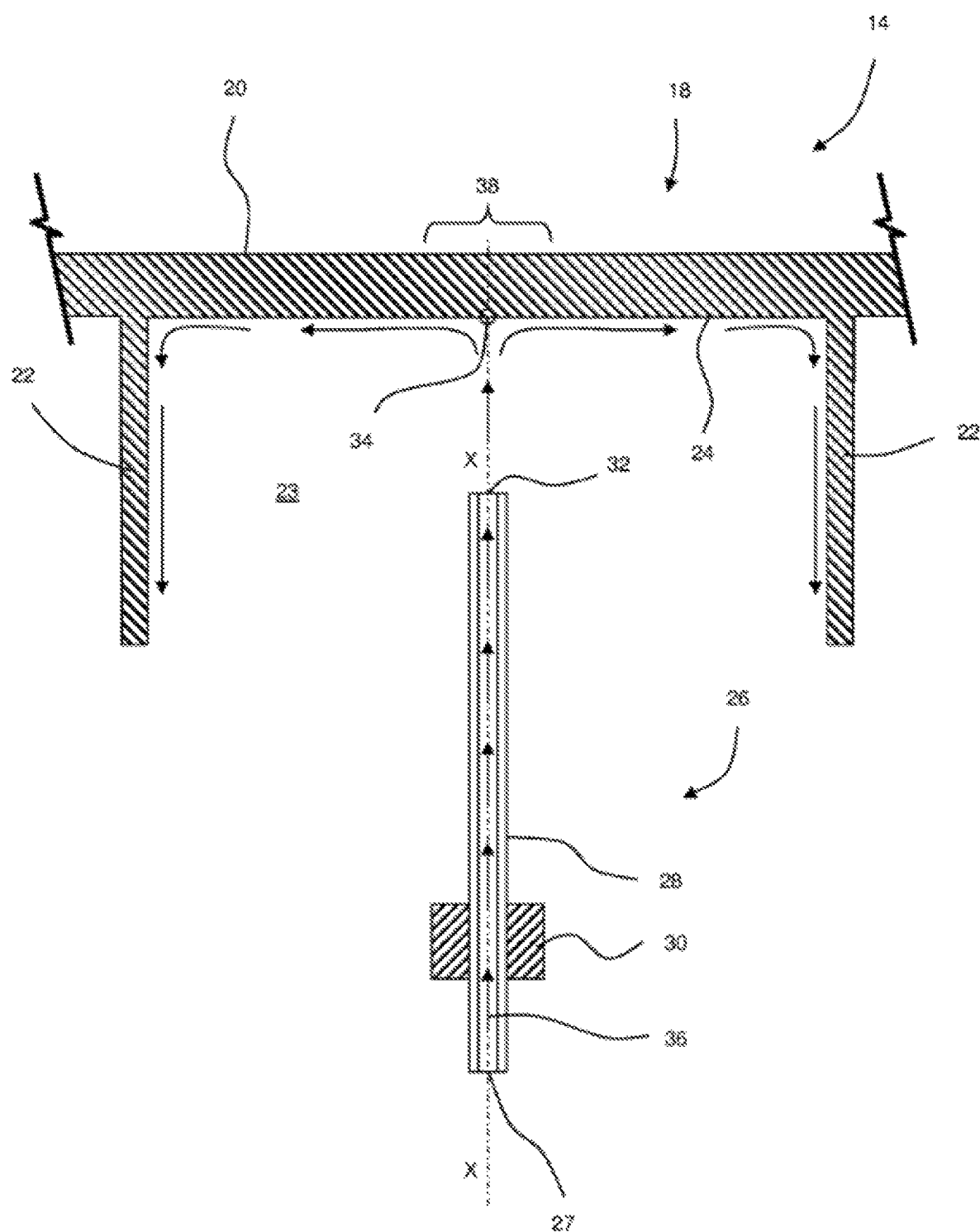
FIG. 2 is a side section view of a part of the fluid jet heated mould tool of FIG. 1.

FIG. 2 shows that each zone 18 of the lower mould tool 14 defines a rectangular mould face 20. Opposite the mould face 20 there is provided a temperature control face 24 which is in thermal contact with the mould face 20—i.e. thermal energy is conducted through the solid substrate of the tool 14. A side wall 22 extends from the temperature control face 24, in a direction opposite to the mould face 20, to define a volume 23.

Directly below the temperature control face 24 there is provided a fluid heating and cooling apparatus 26, which comprises a fluid conduit 28 and an inline air heater 30. The fluid conduit 28 has an inlet 27 connected to a high pressure fluid source (in this case an air compressor). This conduit also has an outlet 32 which is directed towards a fluid impingement point 34 on the temperature control face 24. The conduit has a main axis X which defines the direction of the fluid emanating therefrom.

In order to heat and/or cool the zone 18, air 36 is fed through the conduit 28 where it may be selectively heated by the inline air heater 30 (or in order to cool the tool, the air is simply fed through at ambient temperature). The air exits the outlet 32 and impinges on the temperature control face 24 at the impingement point 34. At this point, the air changes direction and flows towards and down the side walls 22. The main effect of impingement heating and cooling is that a central zone 38 is created in which the heating or cooling effects are strongest. In other words, if heating, the central zone 38 will be significantly warmer than the rest of the zone 18, and if cooling then the central zone 38 will cool faster than the rest of the zone 18. This results from the high heat transfer coefficient associated with an impinging jet. This is problematic as it is desirable to have the temperature as even as possible across the zone 18.

Figure 3A:
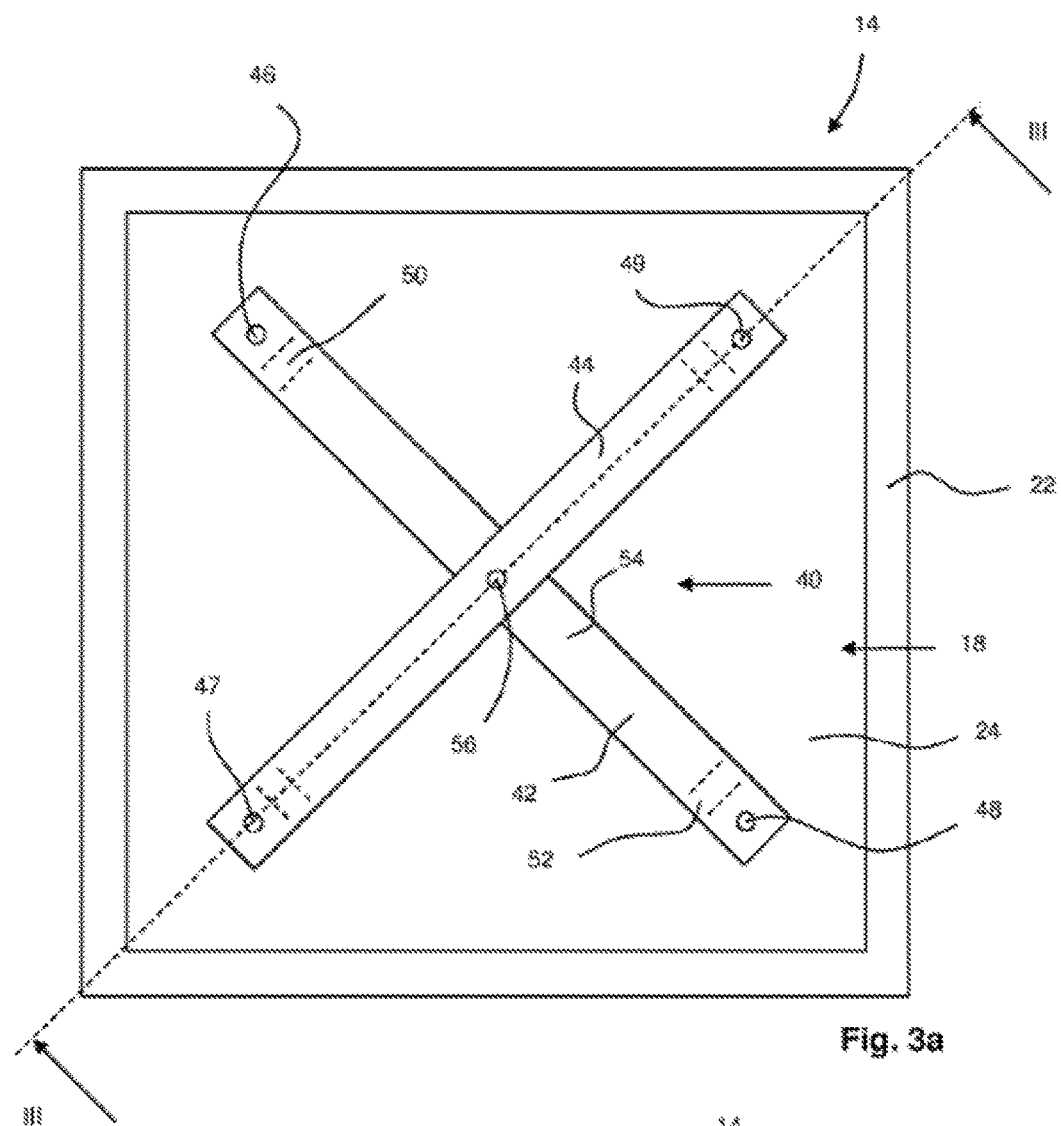
FIG. 3a is a underside view of a first mould tool assembly in accordance with the present invention.
Figure 3B:
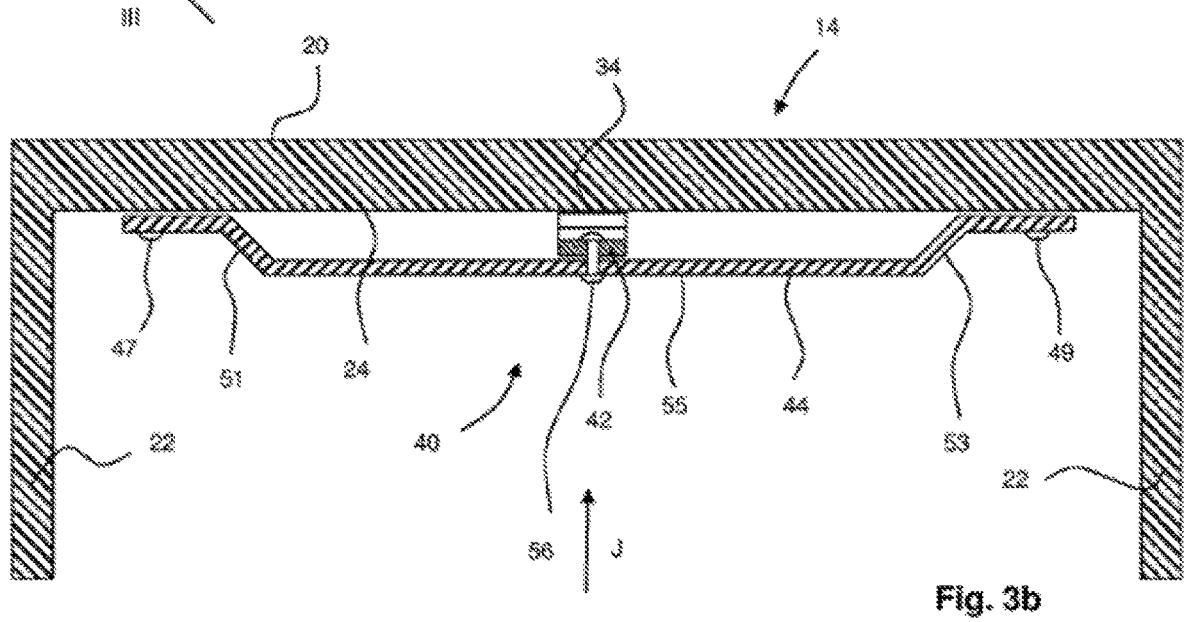
FIG. 3b is a side section view of the mould tool of FIG. 3a along line III.

Turning to FIGS. 3a and 3b, a first embodiment of the present invention is shown. The tool 14 is shown in FIG. 3b, having the mould Thee 20 and respective temperature control face 24 with side walls 22 depending therefrom. The temperature control face 24 has a thermal conduction structure 40 attached thereto. The thermal conduction structure 40 comprises a first leg 42 and a second leg 44, which are crossed in the centre of the face 24. The legs 42, 44 therefore form an "X" or cross-shape. The legs 42, 44 are constructed from a high conductivity metal, specifically copper.

The first leg 42 extends from a first attachment point 46 to a second attachment point 48. Both of the attachment points 46, 48 are spaced from the impingement point 34 and are each proximate a diagonally opposite corner of the temperature control surface 24. At the attachment points 46, 48, the first leg 42 is parallel to and adjacent the temperature control surface 24. Moving towards the centre of the first leg 42, dog-leg sections 50, 52 are provided leading to a central offset region 54 in which the first leg 42 is generally parallel to, but spaced from, the temperature control surface 24.

The second leg 44 is similar to the first leg 42 but oriented at 90 degrees. Referring to FIG. 3a, the second leg 44 comprises a first attachment point 47 at a corner of the surface 24, a second attachment point 49 at a diagonally opposite corner of the surface 24 and two adjacent dog-leg sections 51, 53 respectively, leading to a fiat section 55 in the centre.

The two crossed legs 42, 44 are fastened at the centre of the temperature control face 24 by a mechanical attachment 56 where they join and overlap. The legs 42, 44 are in thermal contact. It will be understood that the dog legs of the first leg 42 are slightly shallower than those of the second leg 44.

During operation, the fluid jet shown by arrow J in FIG. 3b will impinge directly onto the crossing point of the legs 42, 44. As such it will directly heat the temperature control structure 40. Heat is conducted outwardly through the flat sections 54, 55 to the attachment points 46, 47, 48, 49, where it is conducted into the temperature control surface 24 of the tool 14.

The temperature control structure 40 also partially shields the impingement region of the temperature control face to ensure that heating and cooling is more event. In addition, fluid will flow over the central crossing region of the structure 40 and will directly heat the temperature control surface 24, although to a lesser extent than with direct impingement. Due to the combined effect of reduced direct impingement on the temperature control surface and the increased conduction to the periphery of the mould tool 14, more even heating of the tool is observed, Turning to FIGS. 4a and 4b, a second embodiment of the present invention is shown in which like features have identical reference numerals.

Figure 4A:
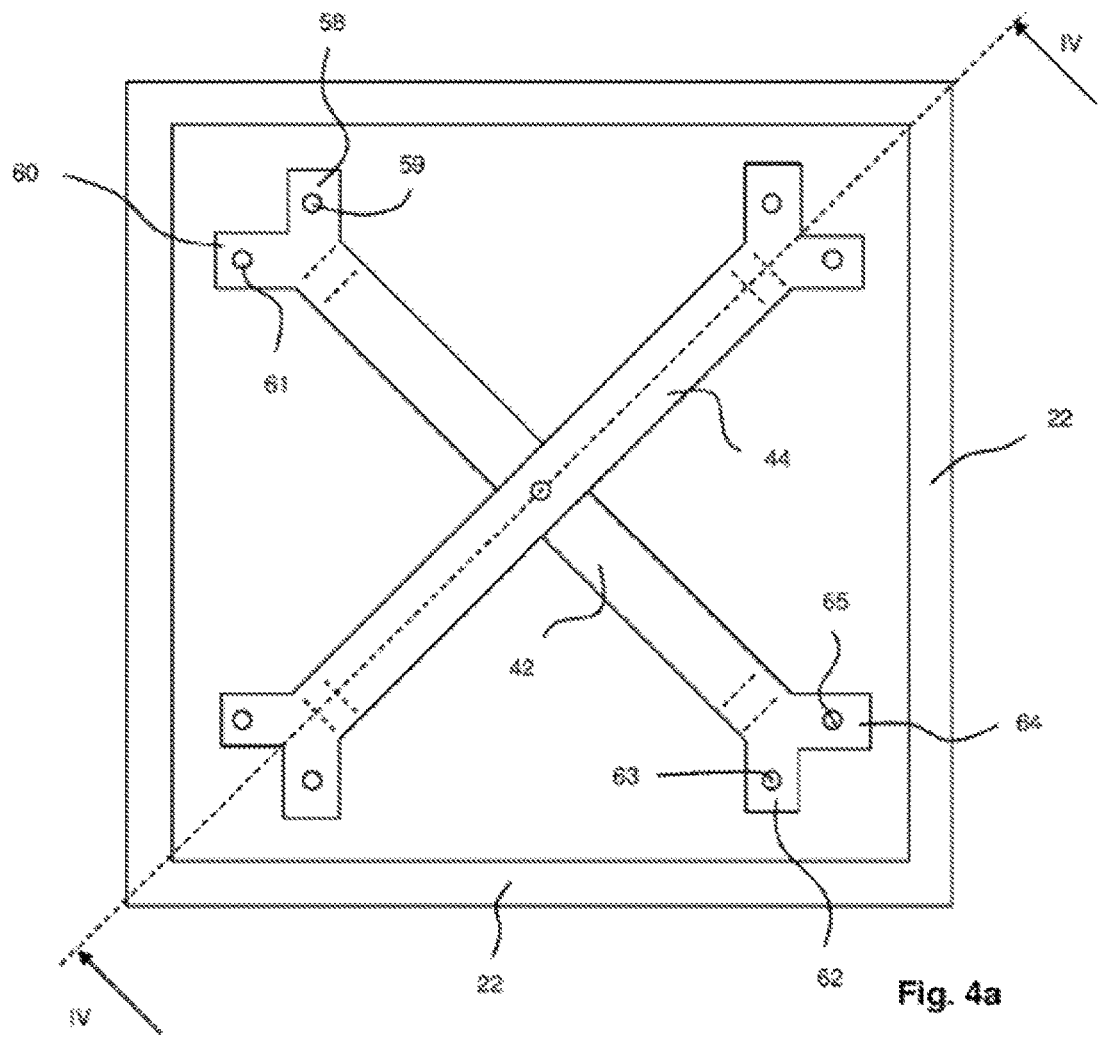
FIG. 4a is an underside view of a second mould tool assembly in accordance with the present invention.
Figure 4B:
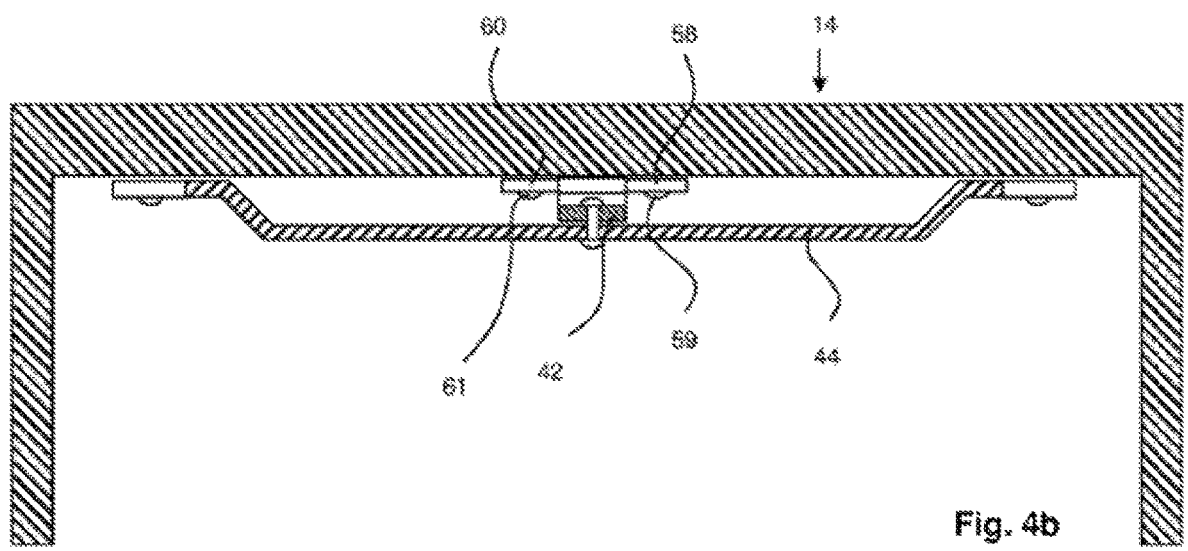
FIG. 4b is a side section view of the mould tool of FIG. 4a along line IV-IV.

The main difference between the embodiment of FIGS. 3a and 3b, and that of FIGS. 4a and 4b, is that each end of each leg 42, 44, bifurcates into two feet 58, 60 in respect of one end of the first leg 42 and 62, 64 in respective of the opposite end of the first leg 42. As shown in FIG. 4a, each of the feet 58, 60, 62, 64 comprises an attachment point 59, 61, 53, 65 where it is in thermal contact with the tool 14. The second leg 44 is also bifurcated in this manner.

The benefit of this arrangement is that the thermal energy is more spread out around the circumference of the zone of the tool 14, thus avoiding any temperature gradients along the length of each of the side walls 22.

Figure 5A:
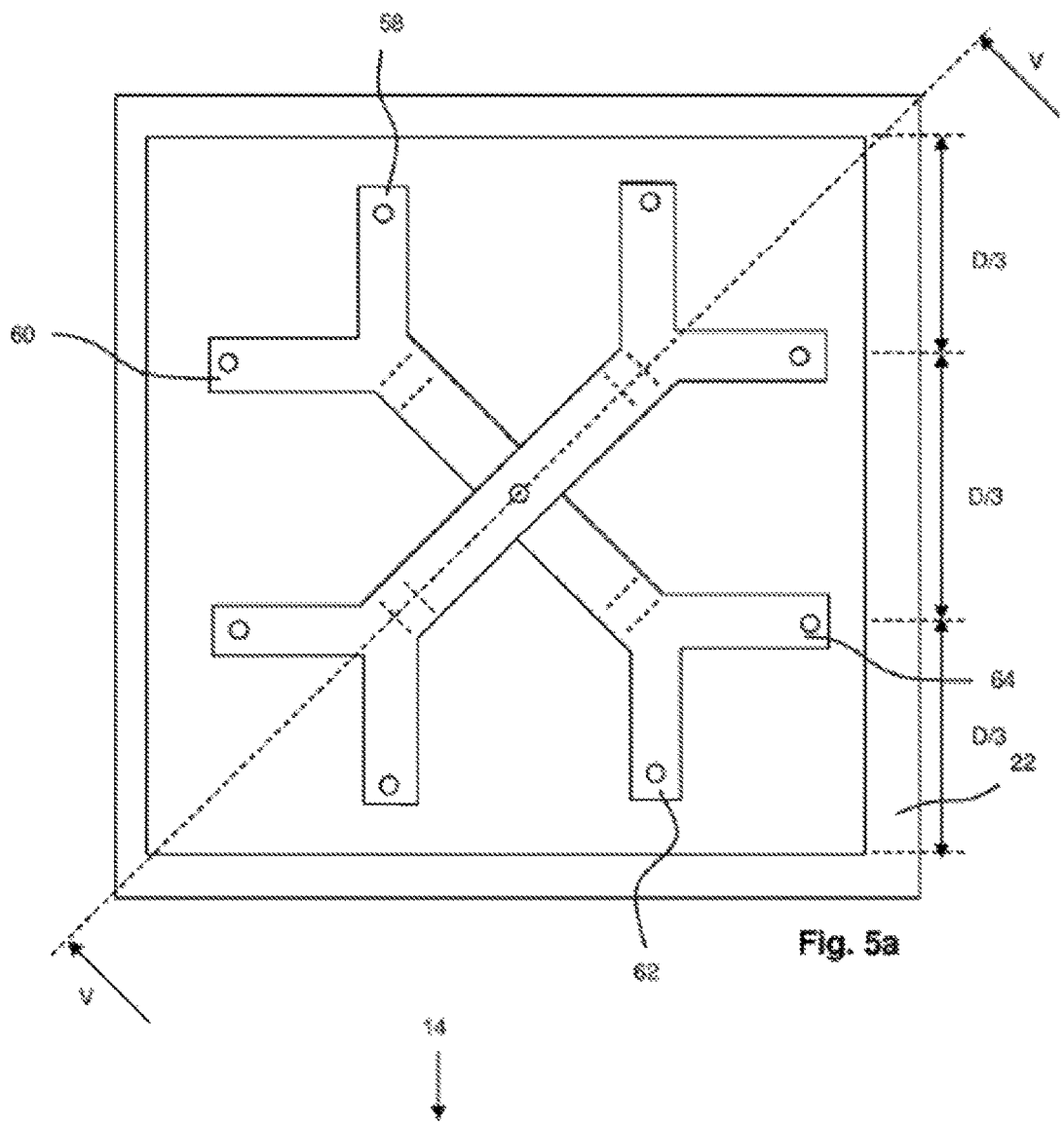
FIG. 5a is an underside view of a third mould tool in accordance with the present invention.
Figure 5B:
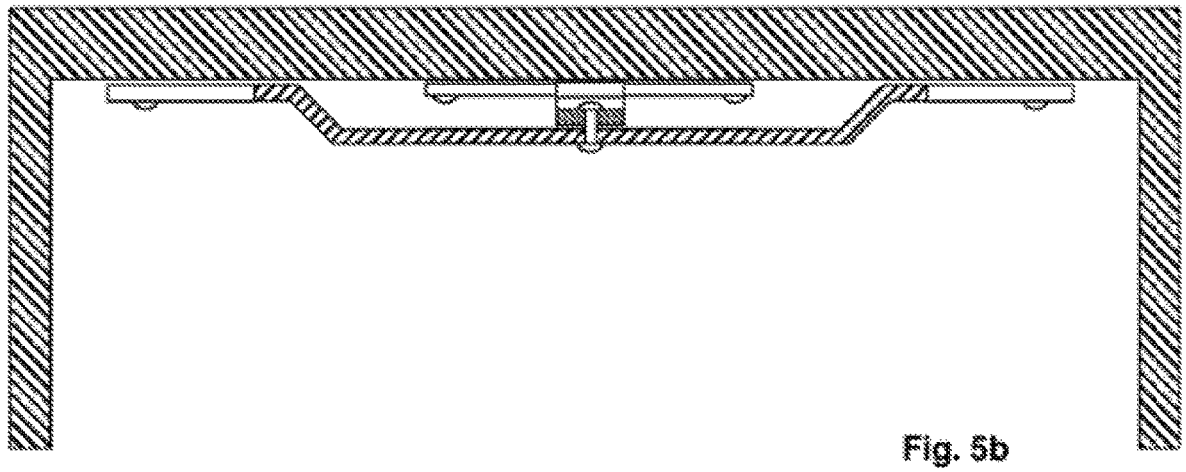
FIG. 5b is a side section view of the mould tool of FIG. 5a along line V-V.

Turning now to FIGS. 5a and 5b, the embodiment shown therein is similar to that of FIGS. 4a and 4b. The main difference is that the feet 58, 60, 62, 64 are further spaced apart such that each of the attachment points is one third of the way along the side wall. As such, if a side wall has length D, then the attachment points are spaced by distance D/3 apart. They are also distance D/3 from the side walls. This is intended to give even temperature distribution across the tool 14.

Figure 6A:
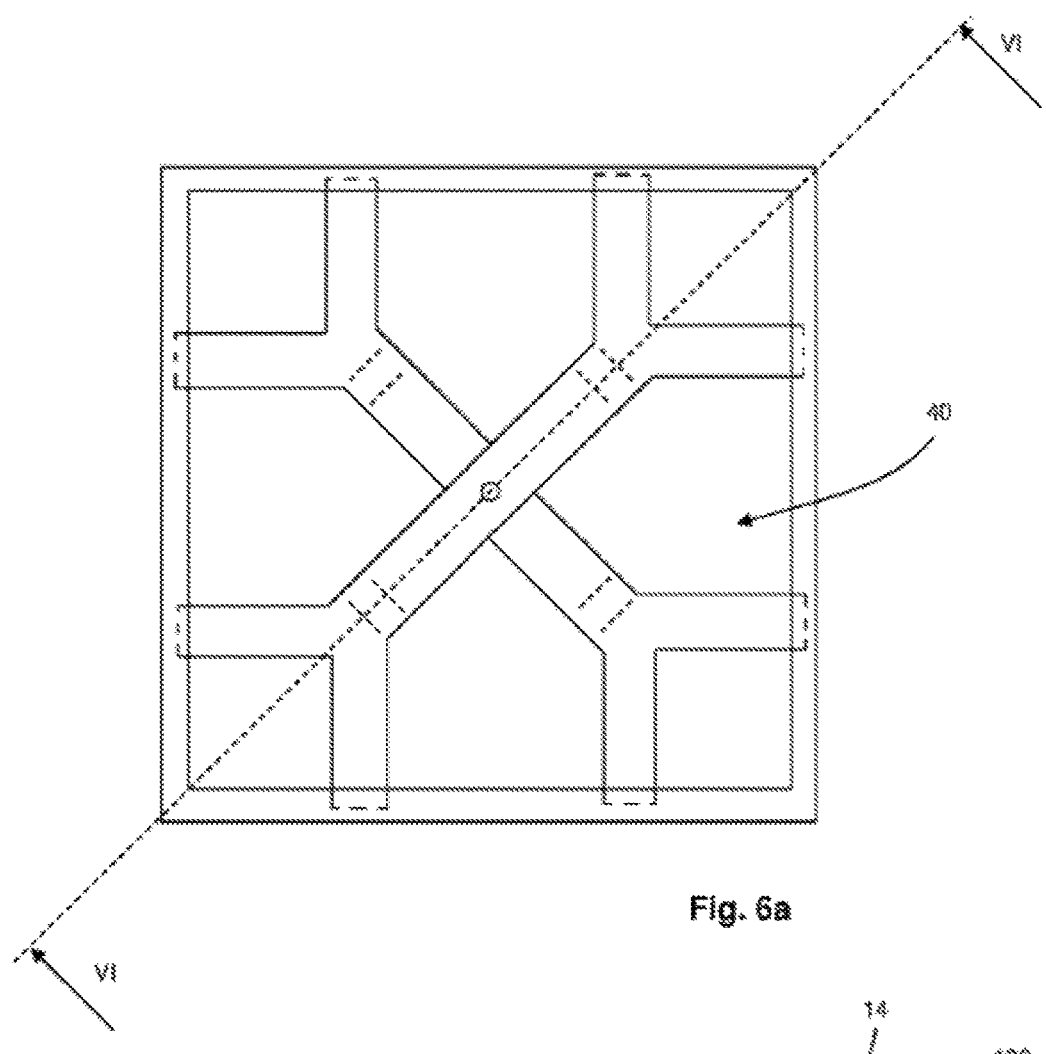
FIG. 6a is an underside view of a fourth mould tool in accordance with the present invention.
Figure 6B:
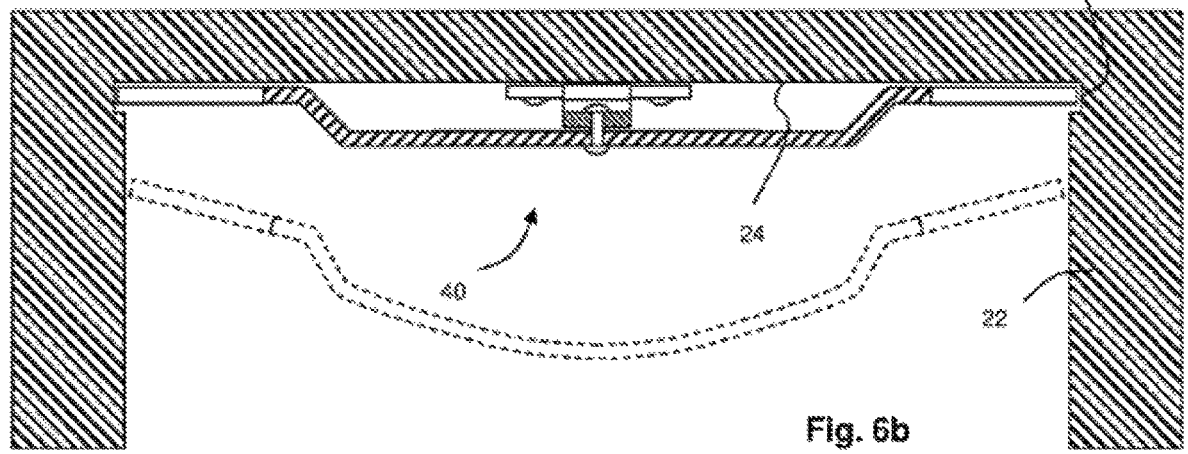
FIG. 6b is a side section view of the mould tool of FIG. 6a along line VI-VI.

Turning to the embodiment shown in FIGS. 6a and 6b, the temperature control structure 40 disclosed therein is held within a groove 100 formed between the side wall 22 and the temperature control surface 24 of the tool 14. As shown in hidden line in FIG. 6b, the temperature control structure 40 can be deformed and snap-fitted into position within the groove 100 such that it stays in place. This allows for easy replacement of the temperature control structure 40 should this be required it is also envisaged that no mechanical attachments will be required to affix such an arrangement to the tool 14.

Figure 7:
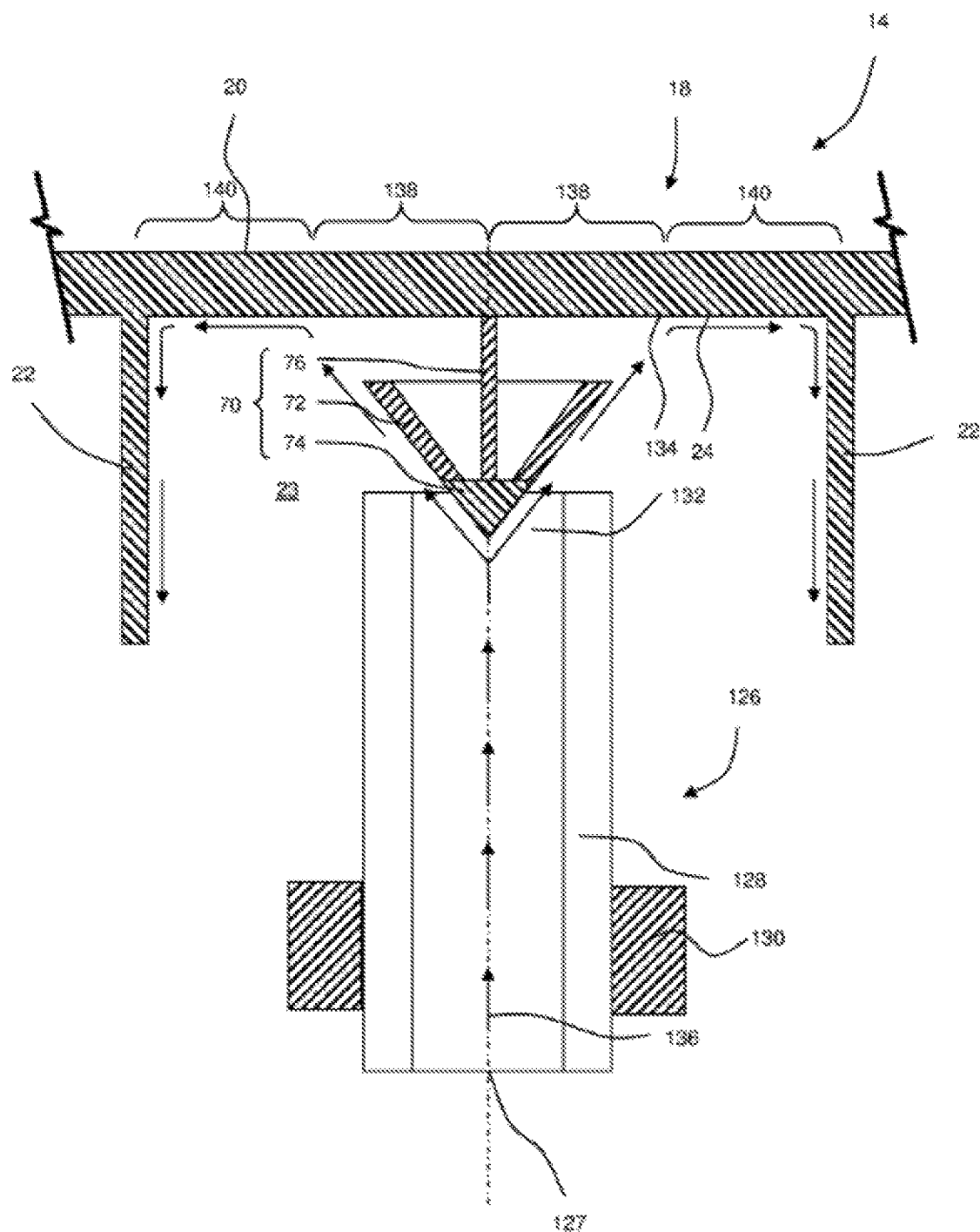
FIG. 7 is a side section view of a fifth mould tool in accordance with the present invention.

An alternative arrangement for providing heating and cooling of the temperature control face 24 of the mould tool 14 is shown in FIG. 7.

A heating and cooling apparatus 126 comprises a fluid conduit 128 and an inline air heater 130 (the heater 130 has a resistive heating, element positioned in the air flow-not shown). The fluid conduit 128 has an inlet 127 connected to a high pressure fluid source. The fluid conduit also has an outlet 132 which is directed towards the temperature control face 24.

Between the outlet 132 and the temperature control face 24 a diffuser 70 is provided, comprising has a hollow frustroconical body 72 with a solid tip 74, thereby forming a conical outer surface. The diffuser 70 is suspended from the temperature control face 24 by a fixing member 76 which is attached to the solid tip 74. The diffuser 70 is arranged such that the solid tip 74 is partially within, and concentric with, the fluid conduit 128 so as to define an annular flow path at the outlet 132. In order to heat and/or cool the zone 18, air 136 is fed through the conduit 128 where it is selectively heated by the inline air heater 130 (or in order to cool the tool, the air is simply fed through at ambient temperature). As the air approaches the outlet 132 it is deflected by the diffuser 70, such that the air impinges on the temperature control face 24 at an annular impingement region 134 concentric with the diffuser 70. From this annular impingement region 134 the air changes direction and flows towards and down the side walls 22.

The main effect of the annular impingement region 134 is that two regions (of equal area) are created (i) within and (ii) outside the annular impingement region 134 on the temperature control surface 24. These are shown as an inner region 138 and an outer region 140. Conduction of heat takes place equally into the region 138 and out to the region 140 across the temperature control surface 134 leading to a more homogeneous temperature profile across the zone 18.

Figure 8:
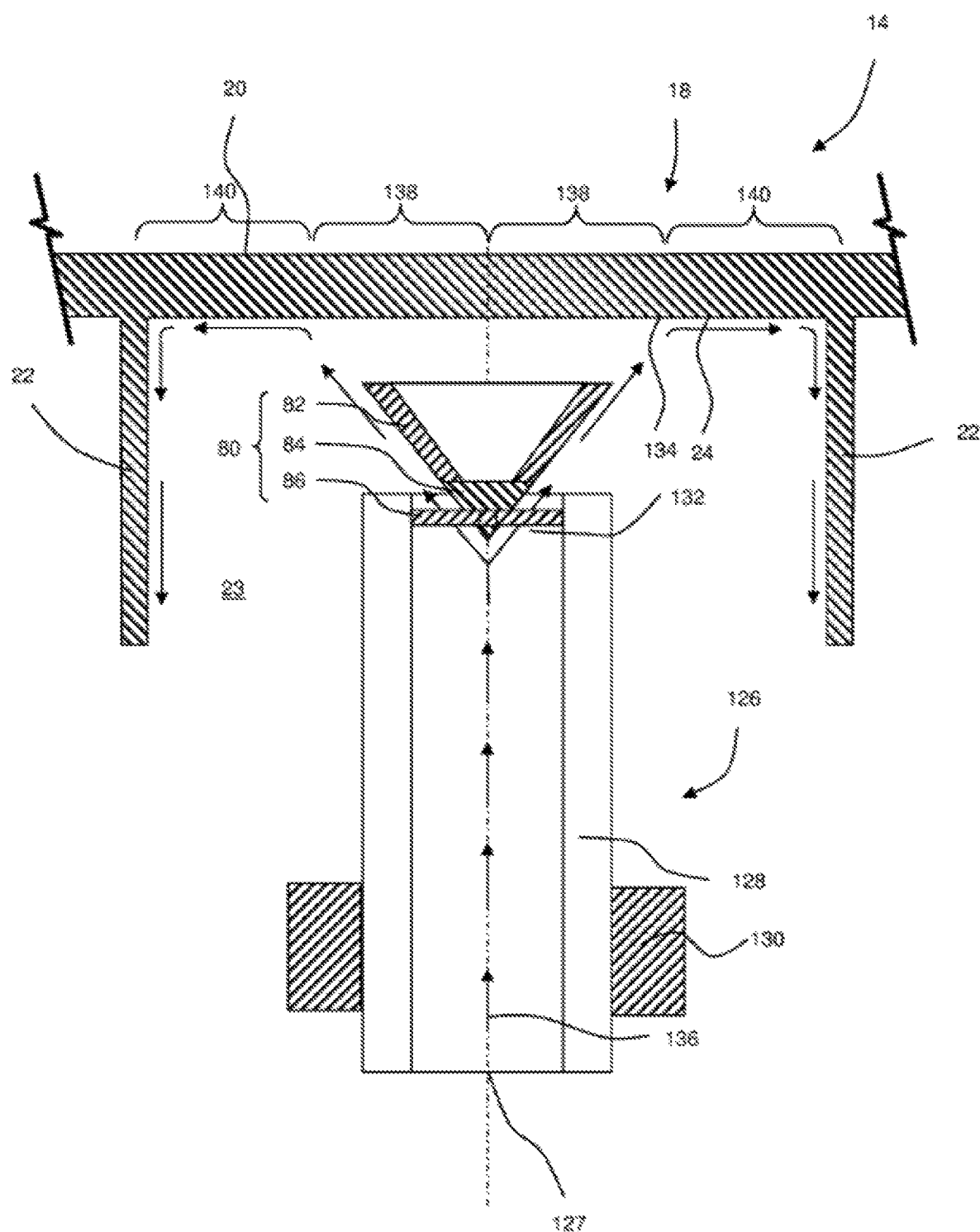
FIG. 8 is a side section view of a sixth mould tool in accordance with the present invention.

An alternate mounting arrangement for the diffuser is shown in FIG. 8. The mould tool is substantially similar to that shown in FIG. 7 and only the differences shall be described.

Instead of suspending the diffuser 70 by a fixing member 76 from the temperature control face 24, a diffuser 80 is mounted on a support structure comprising four spokes 86 extending inwardly from the fluid conduit 128, Like the diffuser 70, the diffuser 80 comprises a body 82 and tip 84. The lack of connection to the face 24 prevents any conduction from the diffuser 80, which may create a "hot spot".

Figure 8A:
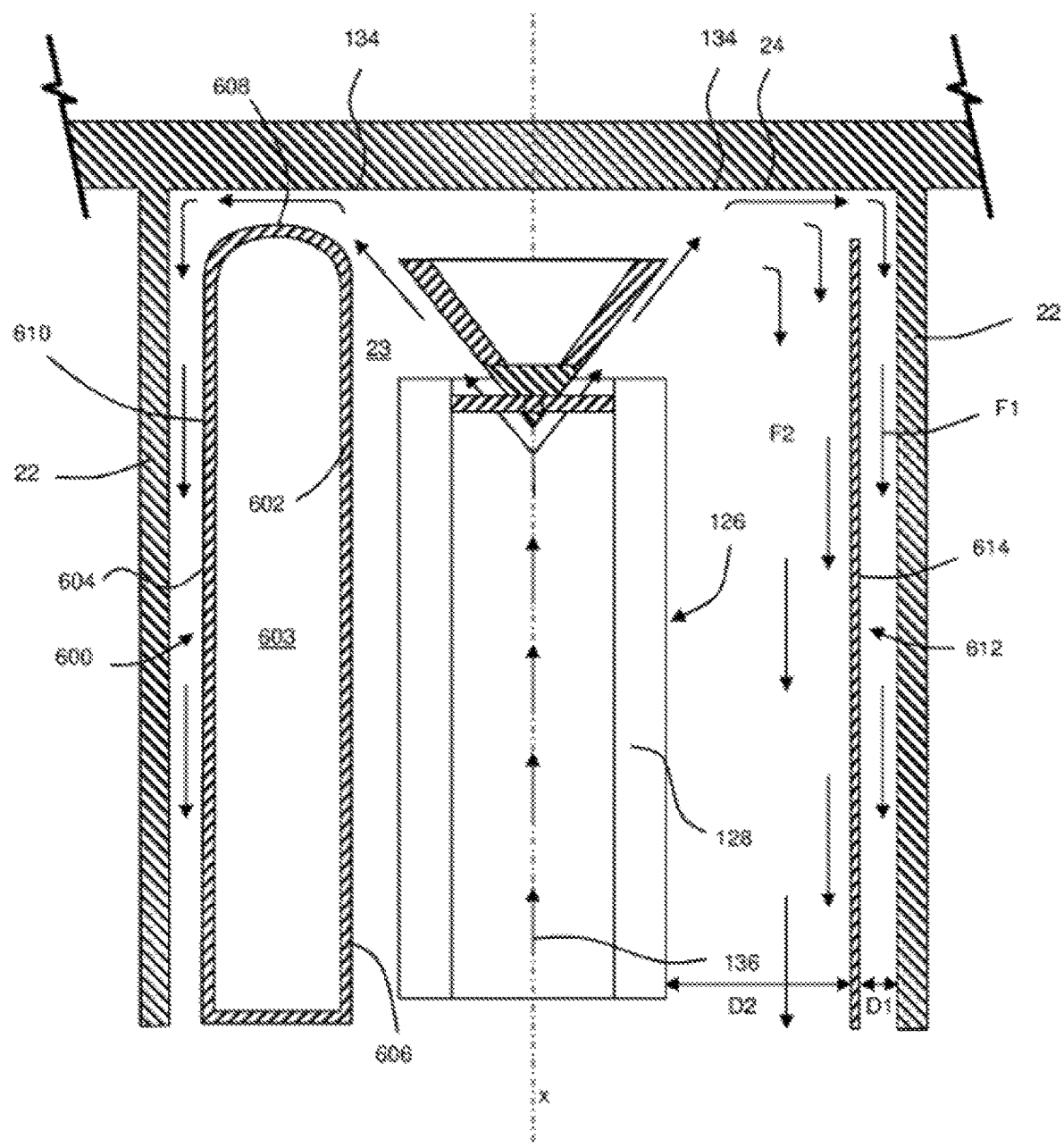
FIG. 8a is a side section view of a seventh mould tool in accordance with the present invention.

Two alternate flow influencing arrangements which work in conjunction with the diffusers of FIGS. 7 and 8 are shown in FIG. 8a. The mould tool is substantially similar to that shown in FIG. 8 and only the differences shall be described.

In FIG. 8a, the left hand side shows one embodiment, and the right hand side shows another. It will be understood that either embodiment may be used, but preferably not together.

On the left hand side of FIG. 8a, a baffle 600 is shown, which in practice would surround the conduit 128. The baffle 600 comprises a hollow body 602 having a cavity 603, the body 206 sitting between the conduit 128 and the wall 22 inside the volume 23. The body 602 defines an outer surface 604 having a first surface 606 facing the conduit 128, a second surface 608 facing the temperature control face 24 and a third surface 610 facing the sidewall The effect of the baffle 600 is to create a narrow flow channel between the temperature control face 24 and the second surface 608. This narrow channel accelerates the fluid flow (indicated by the arrows) past the face 24 which both improves heat transfer to the face 24 and also improves thermal distribution towards the peripheries.

A further effect is to insulate the returning flow (between the third surface 610 and the sidewall 22) from the heat of the conduit 128. Because the returning flow has a temperature inherently lower than the fluid in the conduit 128, without the baffle 600 there is a constant flow of thermal energy from the conduit 128 to the flow. With the baffle in situ, it can absorb thermal energy and increase in temperature. Once the temperature difference between the baffle 600 and the conduit 128 reduces, less heat is lost through this mechanism. Because the baffle 600 is hollow (i.e. is of low thermal mass), it can heat up and cool down quickly to maintain a temperature similar to that of the conduit 128.

In an alternative embodiment, the baffle may be filled (or solid) to store thermal energy if required.

On the right hand side of FIG. 8a, an alternative baffle 612 is shown, which in practice would surround the conduit 128. The baffle 612 comprises a thin member 614 spaced at a distance D1 from the side wall 22 and D2 from the conduit 128. The member 614 is an appropriately supported a foil layer of 0.1 mm thickness. D1 is lower than D2—for example D1 may be 1 mm whereas D2 is 20 mm.

The effect of the baffle 612 is to create a split flow channel. A low flow F1 passes from the temperature control face 24 between the baffle 614 and the sidewall 22, and a higher flow F2 between the baffle 614 and the conduit 128. The low flow F1 creates an insulating layer of fluid around the inner surface of the sidewall 22 to prevent excessive heat transfer from the returning fluid to the sidewall 23 (cross-zone heating and cooling is undesirable). Therefore the zone in question is better isolated from its neighbours.

Turning to FIG. 9, an alternate diffuser 90 is shown. The diffuser has a hollow conical body 92 with a solid tip 94 like the diffusers 70 and 80. However, the body 92 includes openings 96 positioned in the air flow which allow some of the fluid flow to pass through the diffuser 90, rather than be deflected by the body 92.

Turning to FIG. 10, a further alternate diffuser 200 is shown. The diffuser 200 is similar to the diffuser 90, with the exception that four longitudinally extending ribs 202 are provided equally spaced on its outer surface. The ribs 202 act to split the airflow. A temperature control face 206 is also shown, comprising a first rib 204 and a second rib 206, the ribs 204, 206 forming a cross and delimiting the tool into four areas. Each of the ribs 204, 206 is concave in cross section (as shown for rib 204 in FIG. 10). The combination of the diffuser ribs 202 and the ribs 204, 206 means that the heating/cooling air is directed into the four quadrants of the temperature control surface formed by the ribs 204, 206.

Turning to FIG. 11, a still further alternative diffuser 300 is shown. The diffuser has a hollow conical body 302 with a solid tip 304 like the diffusers 70 and 80. Rather than a circular cross section, the diffuser has a square cross section (but is still tapered) forming a pyramid-like shape. The diffuser 300 will form a square impingement area on the temperature control surface, which may heat square tol zones more evenly.

Figure 12:
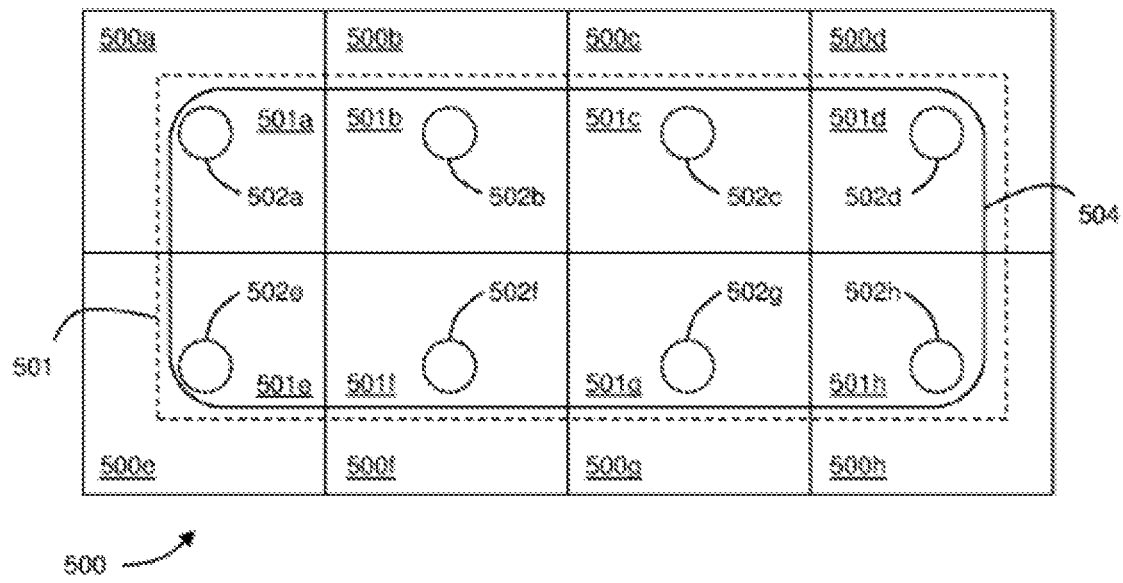
FIG. 12 is a plan view of a zoned mould tool having a diffuser in accordance with the present invention.

Turning to FIG. 12 there is shown a top view of a lower mould tool 500. The mould tool 500 defines eight tessellated heating and cooling zones 500a to 500h. Each zone comprises a separate heating and cooling chamber 501a to 501h (substantially as described above) into which a heating and/or cooling fluid can be introduced to heat and/or cool the mould tool 500 during moulding.

A part to be formed is defined by a mould cavity having a footprint 504 on the moulding face of the tool 500. The part shown is significantly smaller than the tool 500, and as such does not extend to the extremities of the tool. Therefore to heat and cool the entire tool 500 would be wasteful—only heating and cooling across the footprint 504 is required.

Therefore the mould tool 500 is configured to have a periphery 501 of heating/cooling chambers 501, sized to match the cavity footprint 504 to avoid unnecessary use of energy in heating and cooling the areas of the tool outside of the footprint 504.

Therefore as shown in FIG. 12, each chamber 501a to 501h is smaller than its respective zone 500a to 500h. The outer periphery 501 of the chambers 501a to 501h is of smaller area than, and enclosed within, the outer periphery of the tool 500.

A plurality of heating and cooling, apparatuses (not shown, but substantially as described above) are provided, each comprising a conduit 502a to 502h. Each conduit 502a to 502h has an outlet into each chamber 501a to 501h respectively such that the heating and/or cooling fluid is directed toward the temperature control surface of the tool 500.

The conduits 502a to 502h are located in the centre of the zones 500a to 500h. This is determined by the initial tool design. The conduits 502a to 502h are generally immovable. Due to the smaller size of the chambers 501a to 501h, the conduits are in an offset location in the chambers 501a to 501h due to their smaller size and offset position. For example, referring to FIG. 13, the conduit 502a (having axis X) is in the geometric centre of the zone 500a, but offset from the centre of the chamber 501a because of the smaller size and off-centre position of the chamber 501a in the zone 500a.

Figure 13:
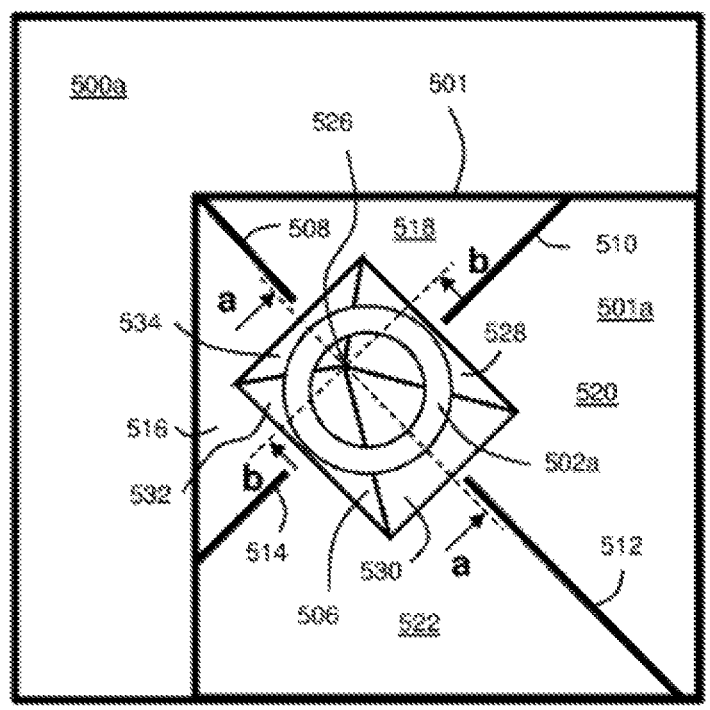
FIG. 13 is a detail view of a zone of the mould tool of FIG. 12.

FIG. 13 shows the zone 500a in more detail without the tool surface visible (i.e. looking directly into the chamber 501a). The chamber 501a comprises four baffles 508, 510, 512, 514 separating it into open sub-chambers 516, 518, 520, 522. The two sub-chambers 516, 518 are smaller than the two sub-chambers 520, 522 diffuser 506 is positioned proximate the outlet of the conduit 502a in a similar fashion to the diffuser 80.

Figure 13A:
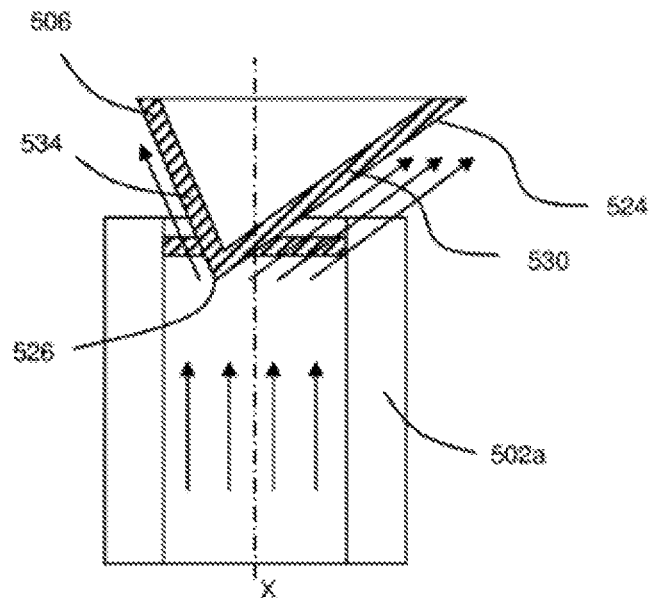
FIG. 13a is a section view of a part of FIG. 13 along a-a.
Figure 13B:
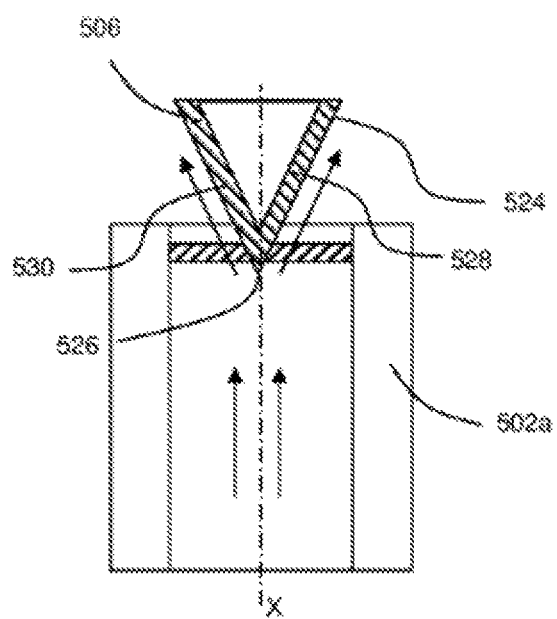
FIG. 13b is a section view of a part of FIG. 13 along b-b.

The diffuser 506 is shown in cross-section in FIGS. 13a and 13b. The diffuser 506 has a convex outer surface 524 having an apex 526 pointing towards the conduit 502a. In other words, the diffuser 506 tapers outwardly from the conduit 502a towards the mould tool 500. The diffuser is in the shape of a pyramid, in this instance having 4 sides 528, 530, 532, 534 and an open base 536. The pyramid is skewed such that the face 530 extends at a shallower angle between the apex 526 and base 536 than the opposite side 534. This creates an asymmetrical diffuser in cross section (in particular in cross section a-a).

The diffuser 506 is positioned relative to the conduit 502a with the apex off-centre from the axis X towards the smaller sub-chambers 516, 518, As shown in FIG. 13a, this encourages more flow towards the larger sub-chambers 520, 522. The gentler slope of the face 530 of the diffuser 530 directs the heating and/or cooling fluid towards into the centre of the sub-chambers 520, 522. The slope of the faces of the diffuser are therefore matched to the size of the sub-chamber in order to ensure that the fluid is directed towards the centre for even heating/cooling.

Variations fall within the scope of the present invention. The mould face 20 and temperature control lace 24 may be provided on different components, as long as they are in thermal contact. This would allow the mould face to be replaced to e.g. form a different shape workpiece.

The diffuser may be machined from metal. Alternatively the diffuser may be produced using Additive Layer Manufacturing (ALM).

The diffuser may be any shape required. For example, it may be curved, polygonal, elliptical, rectangular etc. in cross section.

The invention claimed is:

1. A mould tool assembly comprising:
a mould tool component having a temperature control face disposed in thermal contact with a mould face, the mould tool component defining a fluid chamber and a plurality of baffles that extend from a periphery of the fluid chamber toward an interior of the fluid chamber, the plurality of baffles being configured to separate the fluid chamber into a plurality of sub-chambers that are open to one another and that are disposed adjacent to one another around the periphery of the fluid chamber;
a temperature control arrangement comprising a fluid outlet directed towards the temperature control face; and,
a diffuser disposed between the temperature control arrangement and the temperature control face,
wherein the diffuser is configured to direct fluid flow from the fluid outlet into each of the plurality of sub-chambers.

2. A mould tool assembly according to claim 1, wherein the diffuser tapers outwardly from the fluid outlet towards the temperature control face.

3. A mould tool assembly according to claim 2, wherein the diffuser comprises a surface selected from one of a frustroconical surface, a conical surface, a polygonal surface and a pyramidal surface.

4. A mould tool assembly according to claim 1, wherein the diffuser is asymmetric about at least one axis.

5. A mould tool assembly according to claim 1, wherein the diffuser comprises an apex, which apex is offset to create unequal fluid flow over its sides.

6. A mould tool assembly according to claim 1, wherein the diffuser is disposed at least partially within the fluid outlet of the temperature control arrangement.

7. A mould tool assembly according to claim 1, wherein a support arrangement is provided to attach the diffuser to the temperature control face, which support arrangement does not act to obstruct the fluid flow.

8. A mould tool assembly according to claim 1, wherein the diffuser is mounted on structures extending inwardly from walls of a fluid conduit defining the fluid outlet.

9. A mould tool assembly according to claim 1, wherein the diffuser has a non-continuous surface.

10. A mould tool assembly according to claim 9 wherein openings, perforations or holes are provided through the diffuser.

11. A mould tool assembly according to claim 1, wherein the diffuser is integral with the tool.

12. A mould tool assembly according to claim 1, wherein the diffuser is a curved closed shape in cross section.

13. A mould tool assembly according to claim 1, wherein the mould tool component comprises an endless wall attached to the temperature control face, the wall defining a zone shape where it meets the temperature control face, in which the diffuser is shaped to provide a fluid impingement region substantially homothetic with the zone shape.

14. A mould tool assembly according to claim 1, wherein the diffuser comprises at least one rib extending outwardly from its outer surface.

15. A mould tool assembly according to claim 14, wherein the at least one rib extends axially.

16. A mould tool assembly according to claim 14, wherein the mould tool component defines surface features on the temperature control face, and wherein the at least one rib mirrors the surface features.

17. A mould tool assembly according to claim 16, in which the surface features are mould tool component ribs having a concave cross section.

18. A mould tool assembly according to claim 1, wherein the diffuser is suspended from the temperature control face.

19. A method of manufacturing a workpiece comprising the steps of:
   providing a mould tool assembly comprising a mould tool component having a temperature control face disposed in thermal contact with a mould face, the mould tool component defining a fluid chamber and a plurality of baffles within the fluid chamber, the plurality of baffles being configured to separate the fluid chamber into a plurality of sub-chambers that are open to one another and that are disposed adjacent to one another around the periphery of the fluid chamber;
   providing a temperature control arrangement comprising a fluid outlet directed towards the temperature control face;
   providing a diffuser disposed between the temperature control arrangement and the temperature control;
   directing fluid from the fluid outlet into each of the plurality of sub-chambers such that the fluid is diffused by the diffuser before impinging on the temperature control face to heat or cool the mould tool component; and
   using the mould tool to mould a workpiece.

\* \* \* \* \*